(12) United States Patent
Yamamoto

(10) Patent No.: US 12,190,001 B2
(45) Date of Patent: Jan. 7, 2025

(54) PRINTING APPARATUS HAVING DATA OVERWRITING, CONTROL METHOD OF PRINTING APPARATUS, AND STORAGE MEDIUM

(71) Applicant: CANON KABUSHIKI KAISHA, Tokyo (JP)

(72) Inventor: Kazunari Yamamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/221,994

(22) Filed: Jul. 14, 2023

(65) Prior Publication Data
US 2024/0053933 A1  Feb. 15, 2024

(30) Foreign Application Priority Data
Aug. 9, 2022 (JP) .................................. 2022-127269

(51) Int. Cl.
G06F 3/12 (2006.01)
(52) U.S. Cl.
CPC ............ G06F 3/122 (2013.01); G06F 3/1238 (2013.01)

(58) Field of Classification Search
None
See application file for complete search history.

(56) References Cited

U.S. PATENT DOCUMENTS

| 10,656,870 B2 | 5/2020 | Miyata |
| 2008/0130034 A1* | 6/2008 | Wallin .................. G06F 21/608 358/1.15 |
| 2015/0296094 A1* | 10/2015 | Ishido ................ H04N 1/00798 358/474 |

FOREIGN PATENT DOCUMENTS

JP  2018-124717 A  8/2018

* cited by examiner

Primary Examiner — Lennin R RodriguezGonzalez
(74) Attorney, Agent, or Firm — VENABLE LLP

(57) ABSTRACT

A printing apparatus receives a file transmitted from an external device, stores data included in the file in a volatile memory in a case where the external device is a server providing a secure printing service, and rewrites the data with dummy data, which is stored in a sector to a limit of the capacity in the volatile memory, in a case where the sector of the volatile memory storing the data is invalid. The volatile memory is a RAM and can be used as a RAMDISK.

7 Claims, 8 Drawing Sheets

PRINTING APPARATUS HAVING DATA OVERWRITING, CONTROL METHOD OF PRINTING APPARATUS, AND STORAGE MEDIUM

This application claims the benefit of Japanese Patent Application No. 2022-127269, filed Aug. 9, 2022 which is hereby incorporated by reference herein in its entirety.

BACKGROUND OF THE INVENTION

Field of the Invention

The present disclosure relates to a printing apparatus, a control method of a printing apparatus, and a storage medium.

Description of the Related Art

Japanese Patent Laid-Open No. 2018-124717 has disclosed a technique that uses a RAM as RAMDISK in a case where files are managed. Generally, in a case where files are managed, a file system is used. In the file system, a storage area of data included in a file is divided into units called "sectors" and the file is managed by a sector group.

In recent years, a service is provided in which image data transmitted from a terminal device of a user is not printed or output immediately by a printing apparatus, but printed and output only after the user performs login authentication in front of the printing apparatus and inputs printing instructions. The service such as this is called a "secure printing service" from the standpoint of data security. In a "secure printing service", there is a case where a file including data with confidentiality (also called "confidential data") is transferred from a server to a printing apparatus.

Further, in a "secure printing service", in a case where a file is deleted from the printing apparatus, it is demanded for the data included in the file to be deleted completed so that the data cannot be restored.

However, even though it seems that the file is deleted from the point of view of management of the file system in a case where the file is deleted, there is a case where the data included in the file remains in a volatile memory.

Further in a case where a RAM is used as a RAMDISK, in order to delete the data remaining in the RAM completely, it is necessary to devise a file system driver and this is troublesome.

Consequently, an object of the present disclosure is to provide a technique to make it difficult to restore data remaining in a volatile memory by a method simpler than before.

SUMMARY OF THE INVENTION

In order to achieve the above-described object, the printing apparatus of the present disclosure includes: a reception unit configured to receive a file transmitted from an external device; a volatile memory storing data included in the file in a case where the external device is a predetermined server; and an overwriting unit configured to rewrite the data with dummy data, which is stored in a sector to a limit of the capacity in the volatile memory, in a case where the sector of the volatile memory storing the data is invalid.

Further features of the present invention will become apparent from the following description of exemplary embodiments with reference to the attached drawings.

DESCRIPTION OF THE EMBODIMENTS

In the following, embodiments of the present disclosure are explained with reference to the drawings. The following embodiments are not intended to limit the present disclosure according to the claims and all combinations of features explained in the present embodiments are not necessarily indispensable to the solution of the present disclosure. The same reference numbers are attached to the same components and explanation thereof is omitted.

First Embodiment

<General Configuration of System>

Figure 1:
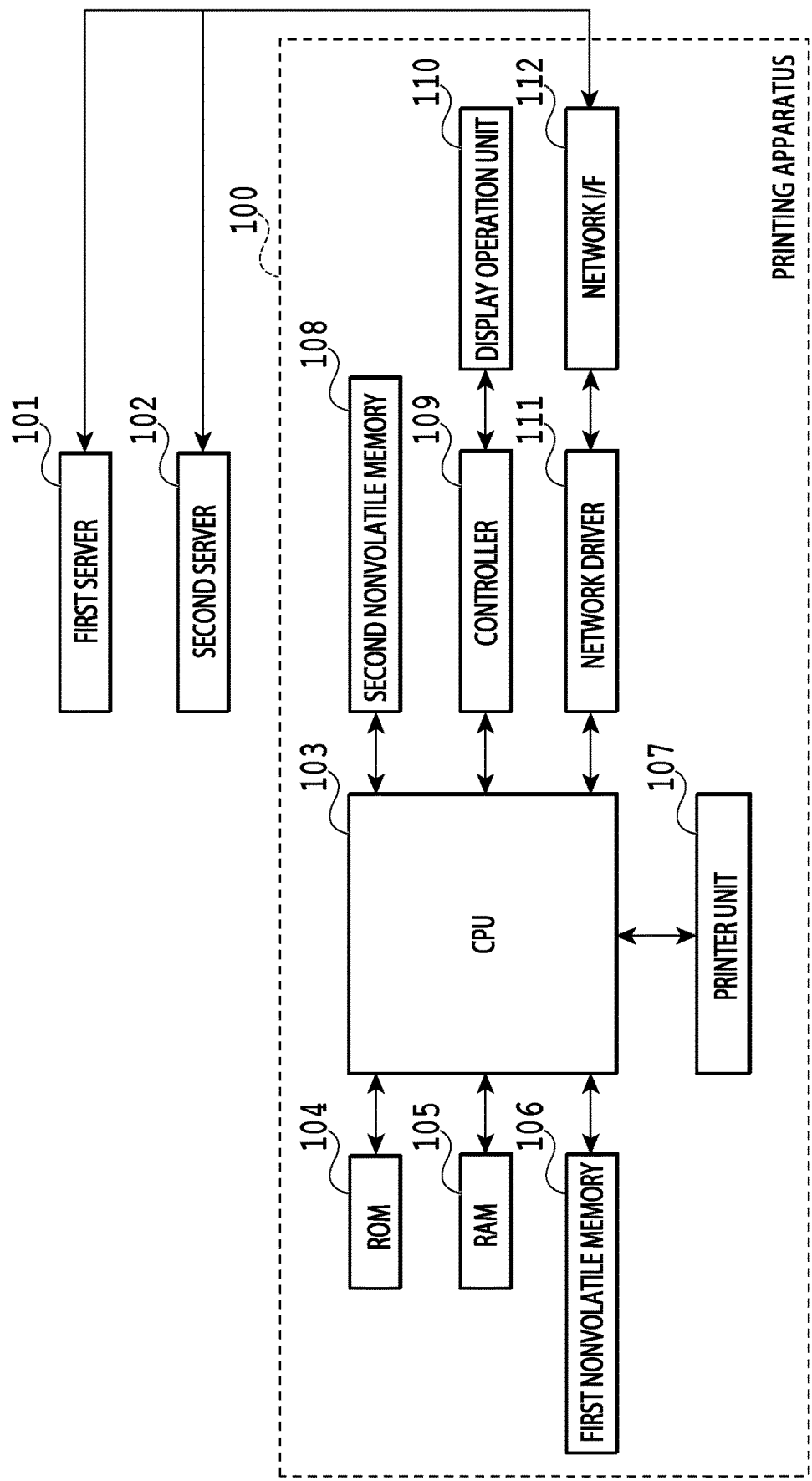
FIG. 1 is a diagram showing one example of a configuration of a printing system in one embodiment.

FIG. 1 is a diagram showing one example of the configuration of a printing system in the present embodiment.

As shown in FIG. 1, the printing system in the present embodiment comprises a printing apparatus 100, a first server 101, and a second server 102. The printing apparatus 100, the first server 101, and the second server 102 are connected via a network and capable of transmitting and receiving a file including predetermined data to and from one another. The first server 101 and the second server 102 are each an external device capable of providing a predetermined service in response to a request from a terminal device (not shown schematically).

As one example of the service provided by the first server 101, there is "secure printing service". That is, it is possible for the first server 101 to transmit and receive a print job including image data and confidential data. As an example of confidential data, there are ID of a user who utilizes "secure printing service", password, configuration of "secure printing service", IP address of the first server 101, and the like. In "secure printing service", a print job transmitted by the terminal device of a user is first transmitted to the first server 101. Following this, the print job is transferred from the first server 101 to the printing apparatus 100. Then, by a user performing login authentication in front of the printing apparatus 100 and inputting printing instructions, the print job is printed and output.

On the other hand, it is possible for the second server 102 to transmit a print job to the printing apparatus 100, but the second server 102 does not provide "secure printing service". That is, the possibility that confidential data is included in a file transmitted from the second server 102 to the printing apparatus 100 is less strong than that in the case of the first server 101. Consequently, it can be said the possibility that a file transmitted from the first server 101 to the printing apparatus 100 includes confidential data is stronger than the possibility that a file transmitted from the second server 102 to the printing apparatus 100 includes confidential data.

The printing apparatus 100 further comprises a CPU 103, a ROM 104, a RAM 105, a first nonvolatile memory 106, and a printer unit 107. Further, the printing apparatus 100 comprises a second nonvolatile memory 108, a controller 109, a display operation unit 110, a network driver 111, and a network OF 112.

The CPU 103 has a function to control the printing apparatus 100. Then, the printer unit 107 has a function to perform printing and output. In the ROM 104, a control execution code (program) of the printing apparatus 100 is stored. Further, in the ROM 104, an application that runs in a case where data transmitted from the first server 101 is printed and a file system, which is a program used to manage files, are stored. In the present embodiment, in the ROM 104, an application for using the RAM 105 as RAMDISK is stored. The RAM 105 functions as a storage unit configured to temporarily store image data that is used for printing and data relating to control of the printing apparatus 100. It is possible to use the RAM 105 in the present embodiment as RAMDISK. The first nonvolatile memory 106 stores various kinds of information necessary for maintenance of the printing apparatus 100. As an example of the first nonvolatile memory 106, there is an NVRAM.

The second nonvolatile memory 108 stores image data that is used for printing of the printer unit 107. The second nonvolatile memory 108 in the present embodiment stores various kinds of data relating to the services provided by the first server 101 and the second server 102, which are transmitted from the first server 101 and the second server 102, in addition to image data. As an example of the second nonvolatile memory 108, there is a NAND-type flash memory.

The printing apparatus 100 comprises the display operation unit 110 having a function as a user interface, such as LCD, LED, key, or touch panel. By using the display operation unit 110, the execution operation, the setting operation and the like by a user of each function of the printing apparatus 100 are performed. The controller 109 conveys these operation instructions between the display operation unit 110 and the CPU 103 and controls the display contents. The printing apparatus 100 has the network OF 112 for connecting with an external connection device. The CPU 103 is connected with the network OF 112 via the network driver 111. By the network OF 112, transmission, reception and the like of instructions to perform printing and a file including a print job are performed between the external device, such as the first server 101 and the second server 102, and the printing apparatus 100.

Figure 2:
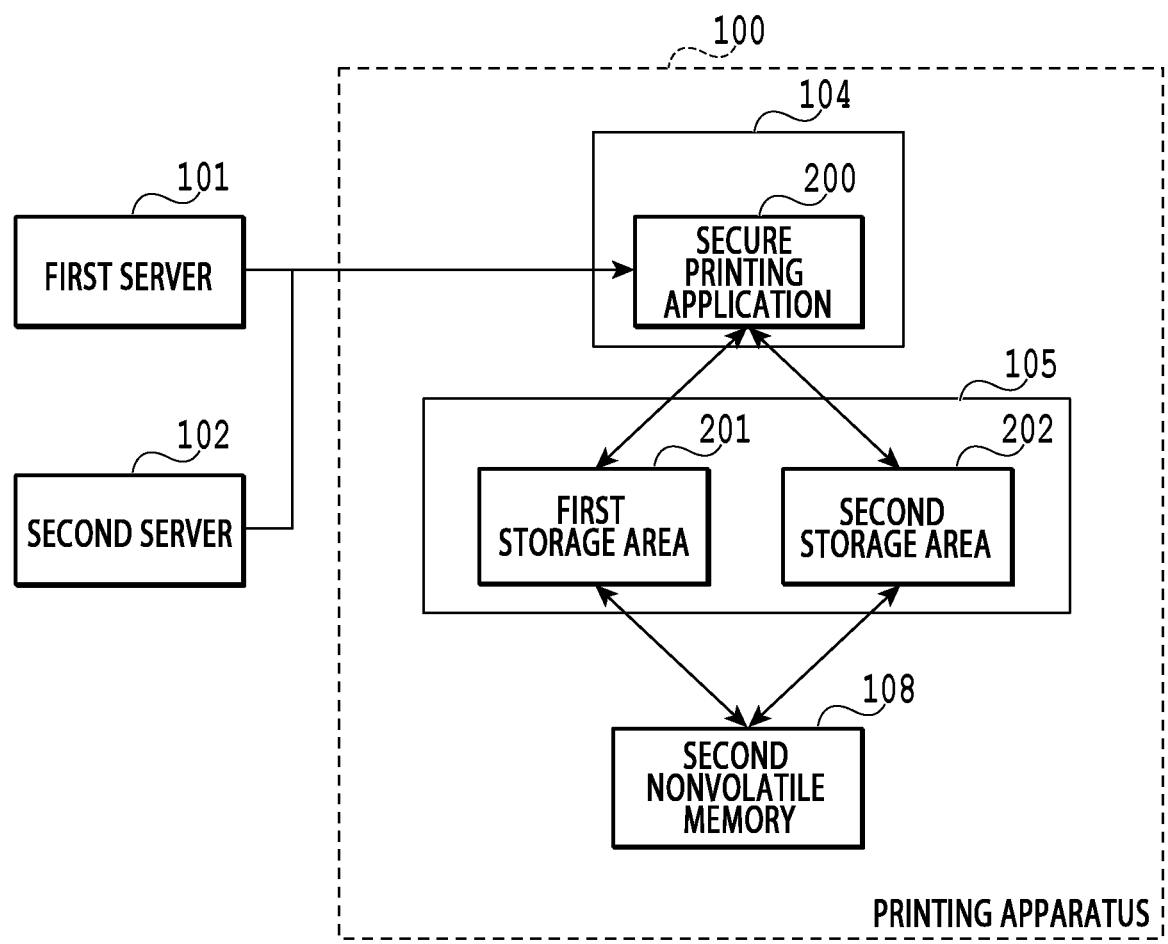
FIG. 2 is a diagram showing a flow of data in one embodiment.

FIG. 2 is a diagram showing a flow of data in the present embodiment.

As shown in FIG. 2, in the ROM 104, a secure printing application 200 is stored. The secure printing application 200 has a function to perform transmission and reception of a file including predetermined data with the first server 101 or the second server 102 via the network OF 112.

Further, the secure printing application 200 has a function to perform login authentication, obtain a print job and a print request, and so on in a case where the "secure printing service" is provided by performing transmission and reception of data with the first server 101. It is possible for a use who utilizes the "secure printing service" to perform operations, such as to perform login authentication and select a print job, by utilizing a user interface temporarily displayed on the display operation unit 110.

Further, the RAM 105 comprises a first storage area 201 for temporarily storing data transmitted from the first server 101 and a second storage area 202 for temporarily storing data transmitted from the second server 102. It is possible to use the first storage area 201 and the second storage area 202 as a RAMDISK.

Further, the RAM 105 comprises a first storage area 201 for temporarily storing data transmitted from the first server 101 and a second storage area 202 for temporarily storing data transmitted from the second server 102. It is possible to use the first storage area 201 and the second storage area 202 as RAMDISK.

Further, in the present embodiment, the secure printing application 200 runs triggered by the printing apparatus 100 receiving a file including predetermined data from the first server 101 or the second server 102. In a case where the secure printing application 200 is running, the CPU 103 distributes processing in accordance with the type of server having transmitted data to the printing apparatus 100. As the method of determining the type of server, it is possible to use a publicly known technique. For example, the CPU 103 determines that the data is transmitted from the first server 101 in a case where the IP address included in the received file matches the IP address of the first server 101, which is stored in advance in the second nonvolatile memory 108. In a case where the server having transmitted the file to the printing apparatus 100 is the first server 101, the CPU 103 temporarily stores the data included in the file in the first storage area 201. At this time, data indicating that the file is temporarily stored in the first storage area 201 is attached to the file.

On the other hand, in a case where the server having transmitted the file to the printing apparatus 100 is the second server 102, the CPU 103 temporarily stores the data included in the file in the second storage area 202. At this time, data indicating that the file is temporarily stored in the second storage area 202 is attached to the file. In the following, data indicating the area selected in a case where data is temporarily stored in the RAM 105 is called "storage area data".

Here, it is preferable for the capacity of the second storage area 202 to be larger than the capacity of the first storage area 201. That is, it is preferable for the capacity of the first storage area 201 to be smaller than the capacity of the second storage area 202. In the present embodiment, processing (in the following, called "overwriting processing") to rewrite data included in the file transmitted from the first server 101 with dummy data not relating to the data is performed in the first storage area 201. The time required to perform "overwriting processing" is in proportion to the remaining capacity of the storage area.

Consequently, it is desirable for the capacity of the first storage area 201 to be a requisite minimum capacity, as a lower limit with which it is possible to perform "overwriting processing". According to the configuration such as this, it is possible to reduce the load imposed on "overwriting processing" compared to the case where the capacity of the first storage area 201 and the capacity of the second storage area 202 are equal.

Lastly, the CPU 103 stores the data included in the file in the second nonvolatile memory 108 at the point in time before the point in time at which electric power is no longer supplied to the RAM 105, irrespective of the type of server having transmitted the file. That is, the data included in the file is stored in the second nonvolatile memory 108 irrespective of whether the data is temporarily stored in the first storage area 201 or in the second storage area 202. For example, the data included in the file is stored in the second nonvolatile memory 108 at the point in time before the point in time at which the power source of the printing apparatus 100 is shut down. The data included in the file received by the printing apparatus 100 may be stored in the first nonvolatile memory 106.

In a case where the printing apparatus 100 is activated, the data stored in the second nonvolatile memory 108 is copied to the RAM 105 and stored temporarily. In this case, in which of the first storage area 201 and the second storage area 202 the data is stored temporarily is determined based on "storage area data" attached to the file received by the printing apparatus 100. In a case where "storage area data" indicates that the data is stored temporarily in the first storage area 201, the data stored in the second nonvolatile memory 108 is copied to the first storage area 201 and stored temporarily. On the other hand, in a case where "storage area data" indicates that the data is stored temporarily in the second storage area 202, the data stored in the second nonvolatile memory 108 is copied to the second storage area 202 and stored temporarily.

<Overwriting Processing>

Generally, data temporarily stored in a volatile memory is deleted completely by electric power being no longer supplied to the volatile memory. In view of this, it is very rare for a general printing apparatus to comprise a function to completely delete data (also called "secure deletion") temporarily stored in a volatile memory. In addition, in order to completely delete data temporarily stored in a volatile memory, it is necessary to devise a file system and this is troublesome.

Consequently, the printing apparatus 100 in the present embodiment rewrites data remaining in the sector of the first storage area 201 provided in the RAM 105 with dummy data not relating to the data in a case of deleting the file. Due to this, even in a case where it is difficult to completely delete the data remaining in the sector, data security is guaranteed.

The sector is the unit in a case where the file system divides and manages the storage medium (for example, RAM 105). Generally, the sector is set to a fixed value, such as 512 bytes. The file system configures a file and a directory by using a sector group including a plurality of sectors. To each sector, header data is attached. In the header data attached to the sector, data for determining which file is managed in the sector group, whether or not the sector included in the sector group is used, or the like, is included.

The data indicating the sector storing data included in a file is managed by the file system. In a case of determining in which area on the physical disk a file is stored, the file system determines the sector on the disk after determining the area in which the file is stored, and stores the data included in the file in the sector and the continuously subsequent sectors. In a case where a sector already used exists in the continuous sectors, there is a possibility that the sector is skipped and the data is stored in another sector that is not continuous. In the present embodiment, in a case where a file is temporarily stored in the RAM 105, a sector group that manages the file is determined in the memory and the data included in the file is stored temporarily in the first sector of the sector group and the continuously subsequent sectors. These files may also be stored temporarily in the address indicating the location of the sector that manages the files.

FIG. 3A to FIG. 3E are each a schematic diagram of the first storage area 201 in the present embodiment. In FIG. 3A to FIG. 3E, the sector that is valid (that is, in the active state) is indicated in white. On the other hand, the sector that is invalid (that is, in the inactive state) is indicated in gray.

Figure 3A:
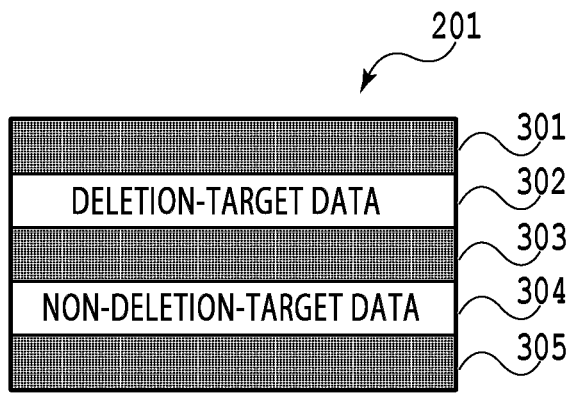
FIG. 3A to FIG. 3E are each a schematic diagram of a first storage area in one embodiment.

FIG. 3A is a diagram showing the state where the file is stored temporarily in the first storage area 201 in a case where the file is deleted. As shown in FIG. 3A, the first storage area 201 comprises a first sector group 301, a second sector group 302, a third sector group 303, a fourth sector group 304, and a fifth sector group 305. In the example shown schematically, the file including a deletion-target data is copied to the second sector group 302. On the other hand, the file including data that is not the deletion target is copied to the fourth sector group 304.

Figure 3D:
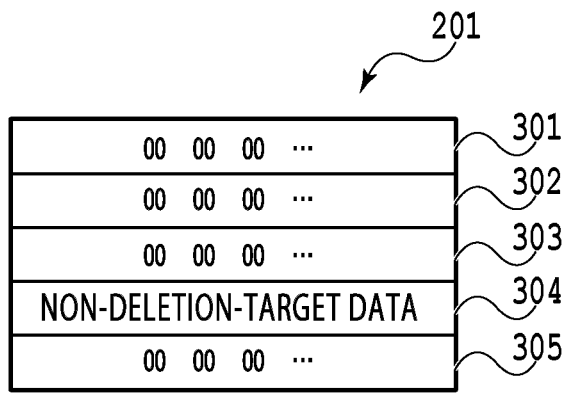
Figure 3B:
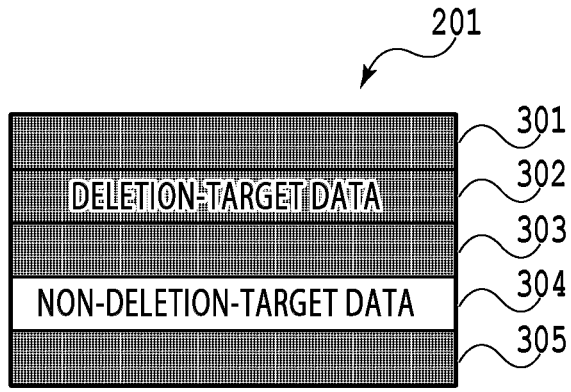

FIG. 3B is a diagram showing the state where a flag indicating that the file is deleted from the state in FIG. 3A is set to each sector of the second sector group 302. For example, in a case where the file is deleted by using the secure printing application 200, the file system sets a flag indicating that the file is deleted to the sector of the sector group to which the file is copied. By doing so, the sector group including the sector to which the flag is set becomes invalid (that is, the inactive state). In the example shown schematically, each sector of the second sector group 302 changes from the active state into the inactive state. However, here, each sector of the second sector group 302 is invalid, but in each sector of the second sector group 302, the deletion-target data still remains. That is, at this point in time, it seems that the data is deleted from each sector of the second sector group from the point of view of management of the file system, but in fact, the deletion-target data remains. Consequently, in the present embodiment, "overwriting processing" to rewrite the data remaining in the sector with dummy data not relating to the data is performed.

Figure 3E:
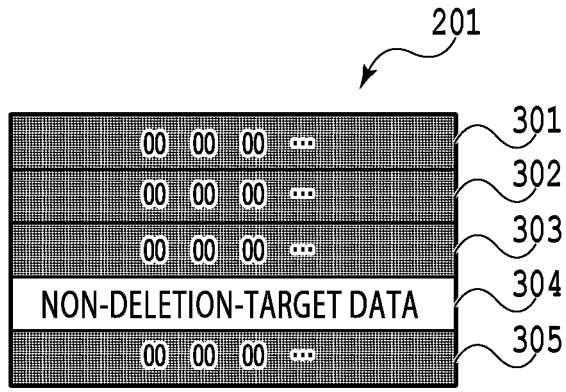
Figure 3C:
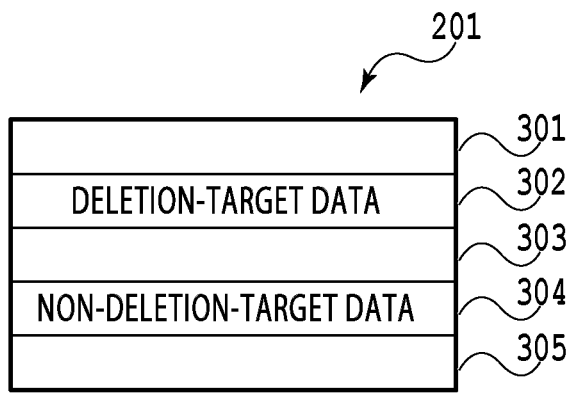

FIG. 3C is a diagram showing the way the sectors in the inactive state have changed into the active state from the state shown in FIG. 3B. As shown schematically, at this point in time, all the sectors in the first storage area 201 become valid.

FIG. 3D is a diagram showing the state where a dummy file is created and the dummy file is copied to the sector group that is not protected and dummy data is written to the dummy file. In the example show schematically, the dummy file is copied to the sector group other than the fourth sector group 304 and to each sector other than the fourth sector group 304, the dummy data is written. As one example of the dummy data, there is a figure of "0". As shown schematically, each sector of the fourth sector group 304 is protected and for each sector of the fourth sector group 304, "overwriting processing" is not performed. As the method of protecting a sector storing data that is not the deletion target, it may be possible to use a publicly known technique. The dummy data that is used in "overwriting processing" is written until the limit of the capacity of the first storage area 201 is reached. After the dummy data is written to the dummy file until the limit of the capacity of the first storage area 201 is reached, the dummy file is closed by the file system. After that, the dummy file is deleted by the file system. Then, a flag indicating that the dummy file is deleted is attached to the sector of the sector group managing the dummy file by the file system.

FIG. 3E is a diagram showing a state where a flag indicating that the dummy file is deleted from the state in FIG. 3D is attached to the sector of the sector group managing the dummy file. As shown schematically, at this point in time, each sector of the sector group other than the fourth sector group 304 is invalid. That is, at this point in time, it seems that the dummy file is deleted from the point of view of management of the file system, but in fact, the state is such that the dummy data remains in each sector of the sector group other than the fourth sector group 304.

According to the configuration such as this, even in a case where the RAM 105 is analyzed, the deletion-target data is overwritten with the dummy data. Because of this, it is made possible to restore the original deletion-target data. That is, according to the configuration of the present embodiment, the data security is guaranteed by overwriting the deletion-target data with the dummy data in place of deleting the deletion-target data.

<Case where New File is Stored>

Figure 4:
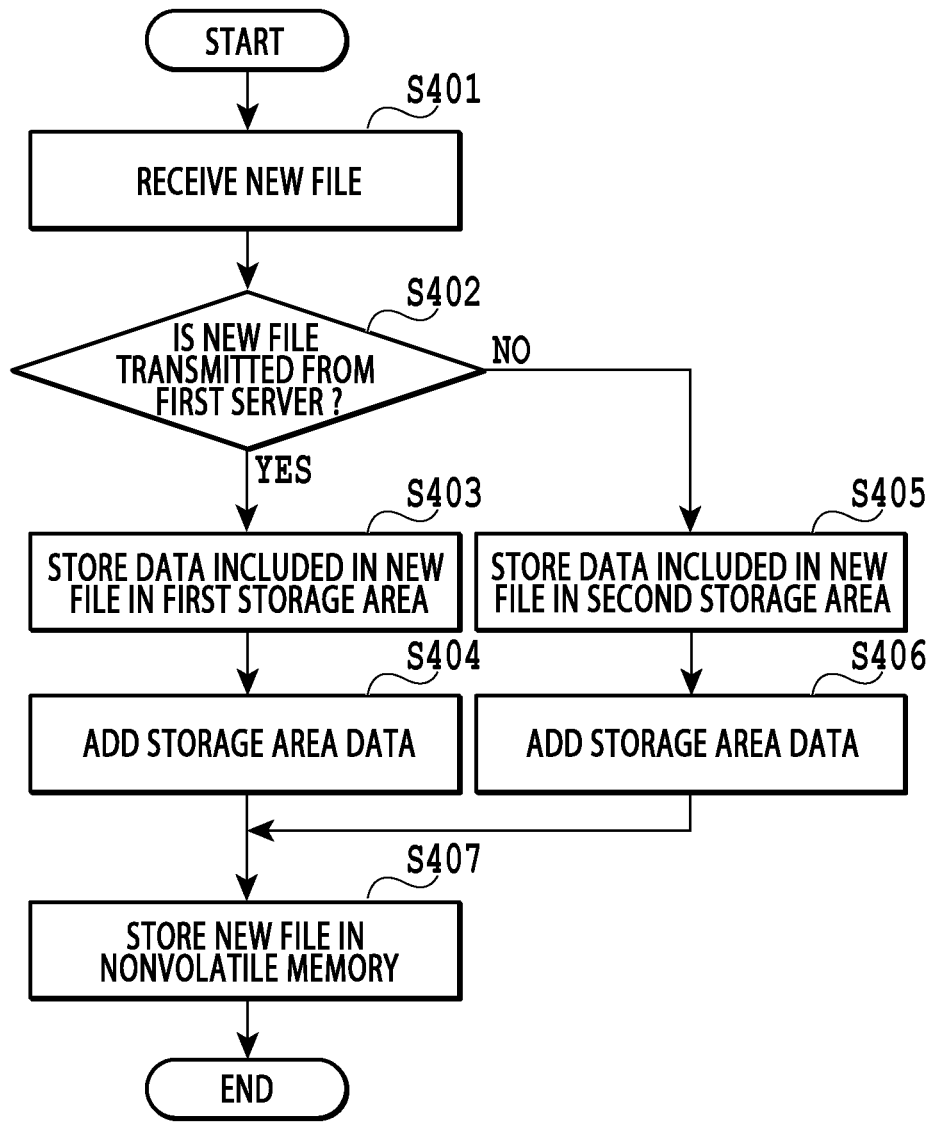
FIG. 4 is a diagram showing a flowchart in one embodiment.

FIG. 4 is a flowchart showing processing from reception of a new file including new data by the printing apparatus 100 until storing of the data in the second nonvolatile memory 108. The series of processing shown in the flowchart in FIG. 4 is performed by the CPU 103 loading the secure printing application 200 stored in the ROM 104 or the like onto the RAM 105 and executing the secure printing application 200. A symbol "S" in the explanation of each piece of processing means a step in the flowchart. This is also the same in flowcharts other than that in FIG. 4.

At S401, the CPU 103 receives a new file including new data from the server. At S402, the CPU 103 distributes the processing in accordance with the type of service having transmitted the new file to the printing apparatus 100. In a case where the server having transmitted the new file to the printing apparatus 100 is the first server 101, the CPU 103 performs the processing at S403. On the other hand, in a case where the server having transmitted the new file to the printing apparatus 100 is not the first server 101, the CPU 103 performs the processing at S405.

At S403, the CPU 103 temporarily stores the data included in the new file in the first storage area 201. After temporarily storing the data included in the new file in the first storage area 201, the CPU 103 performs the processing at S404. At S404, the CPU 103 adds storage area data indicating that the data included in the new file is temporarily stored in the first storage area 201 to the new file. After adding the above-described storage area data to the new file, the CPU 103 performs the processing at S407.

At S405, the CPU 103 temporarily stores the data included in the new file in the second storage area 202. The reason is that, in this case, the new file has been transmitted from a server other than the first server 101, and therefore, the overwriting processing in the present embodiment is not necessary. After temporarily storing the data included in the new file in the second storage area 202, the CPU 103 performs the processing at S406. At S406, the CPU 103 adds storage area data indicating that the data included in the new file is temporarily stored in the second storage area 202 to the new file. After adding the above-described storage area data to the new file, the CPU 103 performs the processing at S407.

At S407, the CPU 103 stores the new file to which the storage area data is added in the second nonvolatile memory 108. That is, the new file is newly added to the second nonvolatile memory 108. After storing the new file in the second nonvolatile memory 108, the CPU 103 terminates the series of processing in this flowchart. The new file may be stored in the first nonvolatile memory 106.

The above is the contents of the entire control from reception of the new file from the server by the printing apparatus 100 until storing of the data of the new file in the nonvolatile memory. In a case where the new file is added to the printing apparatus 100, "overwriting processing" is not performed.

<Case where Stored Data is Deleted>

Figure 5:
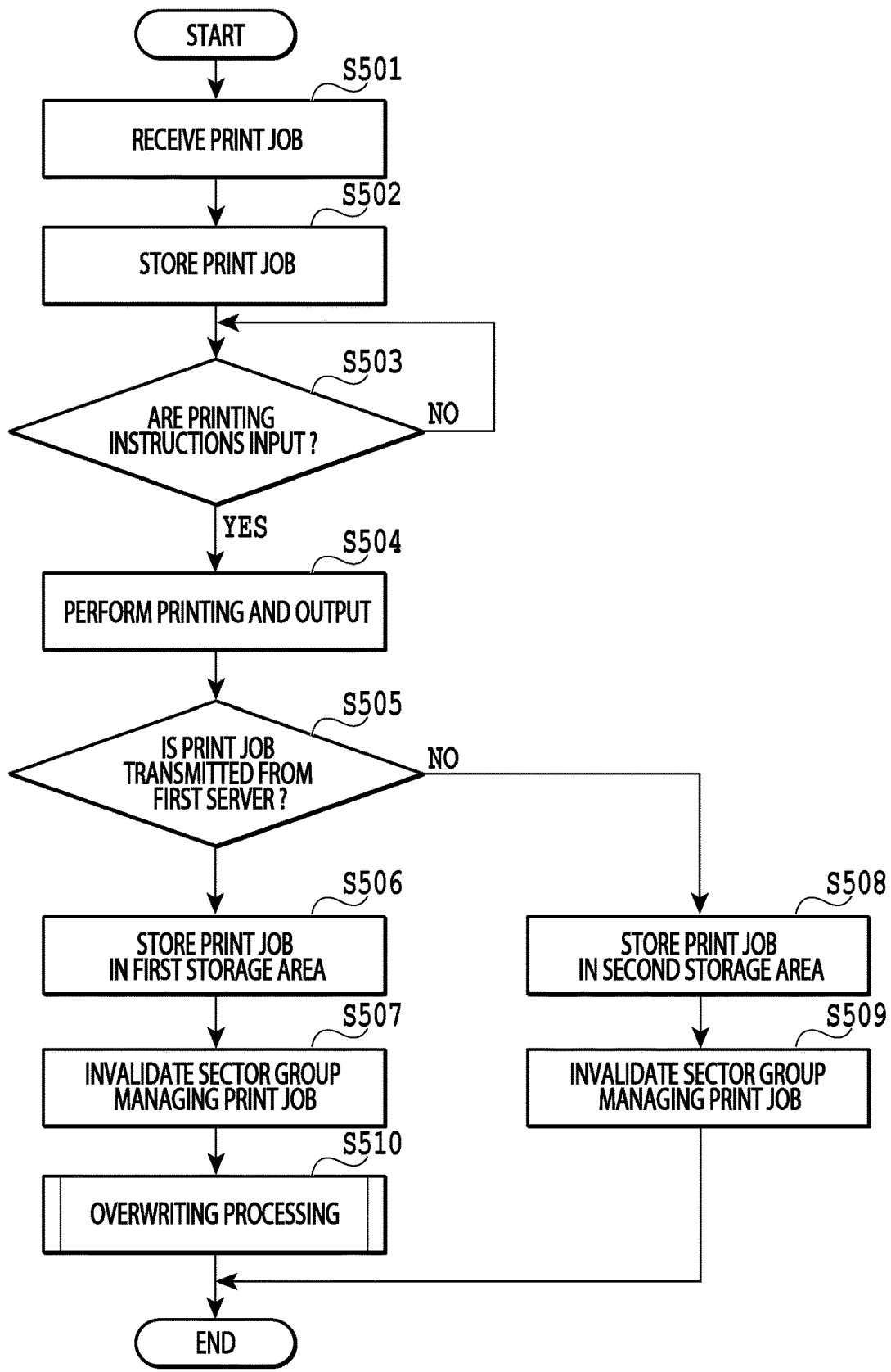
FIG. 5 is a diagram showing a flowchart in one embodiment.

FIG. 5 is a flowchart showing processing from reception of a file until execution of overwriting processing in the present embodiment. Here, explanation is given by taking an example in which the printing apparatus 100 receives a print job, but the type of file that is received by the printing apparatus 100 is not limited to the print job as long as the file can be the target of deletion using the file system.

At S501, the CPU 103 receives a print job including predetermined data from the server. At S502, the CPU 103 stores the print job in the second nonvolatile memory 108. The storage location of the print job may be the first nonvolatile memory 106.

At S503, the CPU 103 distributes the processing in accordance with whether or not there is an input of printing instructions by a user. In a case where there is an input of printing instructions by a user, the CPU 103 performs the processing at S504. On the other hand, in a case where there is not an input of printing instructions by a user, the CPU 103 waits for printing instructions by a user. At S504, the CPU 103 prints and outputs the print job for which printing instructions are input by a user.

At S505, the CPU 103 distributes the processing in accordance with the type of server having transmitted the print job to the printing apparatus 100. In a case where the server having transmitted the print job to the printing apparatus 100 is the first server 101, the CPU 103 performs the processing at S506. On the other hand, in a case where the server having transmitted the print job to the printing apparatus 100 is not the first server 101, the CPU 103 performs the processing at S508.

At S506, the CPU 103 temporarily stores the print job stored in the second nonvolatile memory 108 in the first storage area 201. That is, at this step, the print job for which printing instructions are input by a user is copied to the first storage area 201 of the RAM 105. In a case where the print job is copied to the first storage area 201, the storage area data included in the print job is referred to. In a case where it is determined that the print job has been stored temporarily in the first storage area 201, the CPU 103 copies the print job to the first storage area 201. After temporarily storing the print job in the first storage area 201, the CPU 103 performs the processing at S507.

At S507, the CPU 103 invalidates each sector of the sector group managing the print job for which printing and output have been completed in the first storage area 201. After the processing at this step is completed, the CPU 103 performs the processing at S510.

At S508, the CPU 103 stores the print job in the second storage area 202. At S509, the CPU 103 invalidates the sector group managing the print job in the second storage area 202. After the processing at this step is completed, the CPU 103 performs the processing at S510.

At S510, the CPU 103 performs "overwriting processing". Details of this step will be described later by using FIG. 6. After completing the execution of "overwriting processing", the CPU 103 terminates the series of processing in this flowchart.

The above is the contents of the entire control from reception of the print job by the printing apparatus 100 until execution of "overwriting processing".

<Details of Overwriting Processing>

Following the above, the subroutine that is performed in the process of the flowchart in FIG. 5 is explained. Details of "overwriting processing" that is performed at S510 are explained along the flowchart in FIG. 6.

Figure 6:
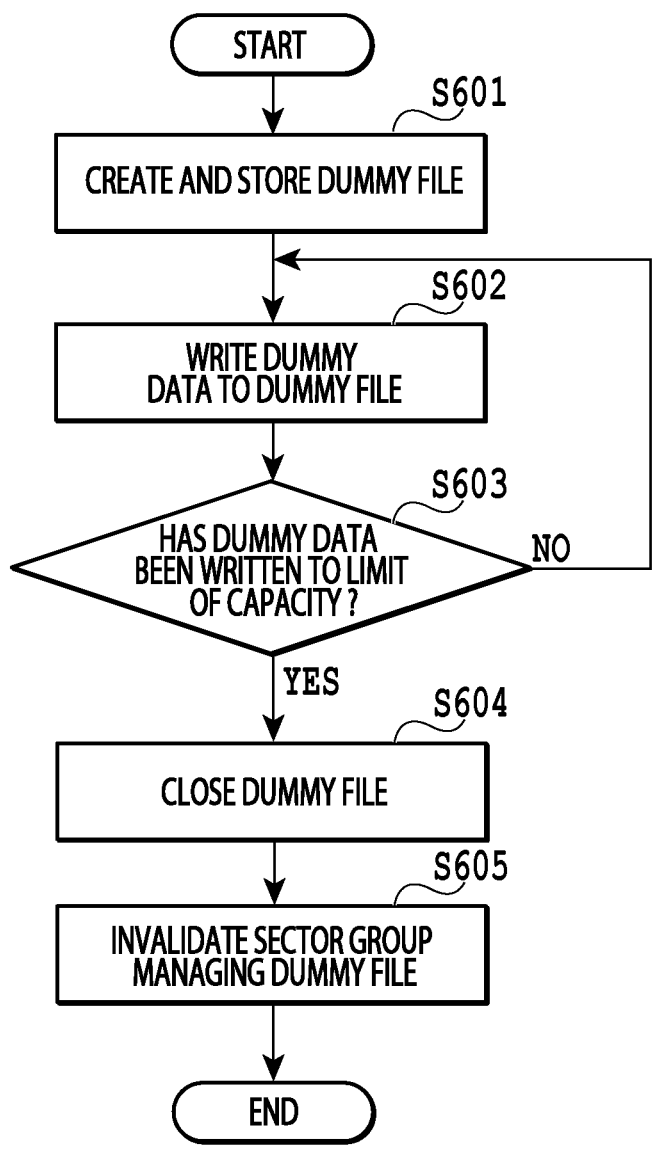
FIG. 6 is a diagram showing a flowchart in one embodiment.

FIG. 6 is a flowchart showing the processing of "overwriting processing" in the present embodiment.

At S601, the CPU 103 creates a dummy file and temporarily stores the dummy file in the unprotected sector group in the first storage area 201. At S602, the CPU 103 writes the dummy data defined as the deletion pattern to the dummy file. That is, at this step, to each sector of all the unprotected sector groups, the dummy data is written.

At S603, the CPU 103 determines whether or not the dummy data has been written to the dummy file to the limit of the capacity in the first storage area 201. For example, in a case where an error of "ENOSPC" occurs in a standard C library, it is determined that the dummy data has been written to the dummy file to the limit of the capacity in the first storage area 201. In a case of determining that the dummy data has been written to the dummy file to the limit of the capacity in the first storage area 201, the CPU 103 performs the processing at S604. On the other hand, in a case of determining that the dummy data has not been written to the dummy file to the limit of the capacity in the first storage area 201, the CPU 103 performs the processing at S602 again.

At S604, the CPU 103 stops writing of the dummy data to the dummy file and closes the dummy file. After closing the dummy file, the CPU 103 performs the processing at S605. AT S605, the CPU 103 invalidates each sector of the sector group managing the dummy file. After invalidating each sector of the sector group managing the dummy file, the CPU 103 terminates the series of processing in this flowchart.

The above is the contents of the overwriting processing in the present embodiment. As described above, in the present embodiment, the dummy data is overwritten by performing the general file operation (open, write, close, delete) for the RAM 105 that is used as a RAMDISK.

With the configuration as in the present embodiment, it is possible to overwrite the deletion-target data remaining in the volatile memory with dummy data not relating to the data as the alternative processing of secure deletion. Consequently, it is made difficult to correctly read the deletion-target data remaining in the volatile memory, and therefore, it is possible to guarantee data security. Consequently, according to the technique of the present disclosure, it is possible to make it difficult to restore data remaining in the volatile memory by a method simpler than before.

A case that is supposed as a case where data may remain in the RAM 105 is a case where file deletion by the file system is performed. That is, in a case where data stored in the second nonvolatile memory 108 is deleted or updated, data may remain in the RAM 105. Because of this, in the present embodiment, in a case where a new file is added to the second nonvolatile memory 108, control is performed so that overwriting processing is not performed. That is, in the present embodiment, control is performed so that the reception of a new file from the first server 101 does not trigger "overwriting processing".

Second Embodiment

An object of the present embodiment is to make it difficult to restore confidential data by a method simpler than before even in case where data is updated.

In the following explanation, explanation of the configuration the same as or corresponding to that of the first embodiment is omitted by attaching the same symbol thereto and different points are explained mainly. In the following, explanation is given by supposing a case where instructions to update data stored in the second nonvolatile memory 108 are transmitted to the printing apparatus 100 from the first server 101. Here, explanation is given by supposing a case where a user newly sets a password again, and therefore, the old password is updated to the new password.

<Case where Data is Updated>

FIG. 7A to FIG. 7F are each a schematic diagram of the first storage area 201 in the present embodiment.

Figure 7A:
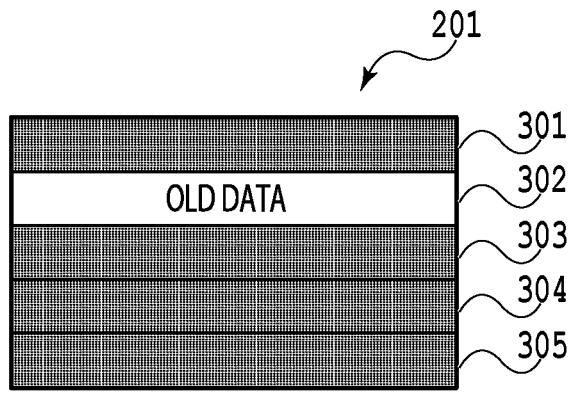
FIG. 7A to FIG. 7F are each a schematic diagram of the first storage area in one embodiment.

FIG. 7A is a schematic diagram showing the state where a file stored in the second nonvolatile memory 108 is copied to the first storage area 201. Here, the data already stored in the second nonvolatile memory 108 at the point in time at which the printing apparatus 100 receives updating instructions is called "old data". In the example shown schematically, the file including the copied "old data" is managed in the second sector group 302 in the first storage area 201. As an example of "old data", there is an old password used by a user previously.

Figure 7D:
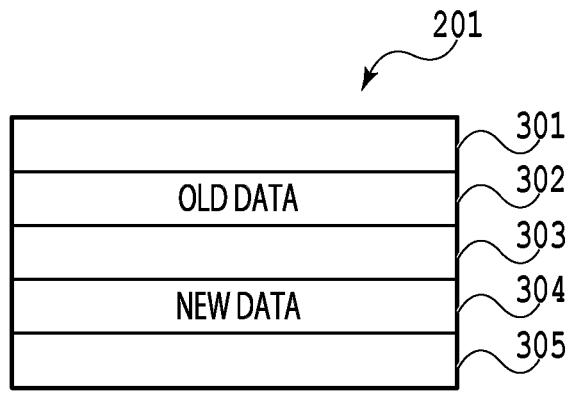
Figure 7B:
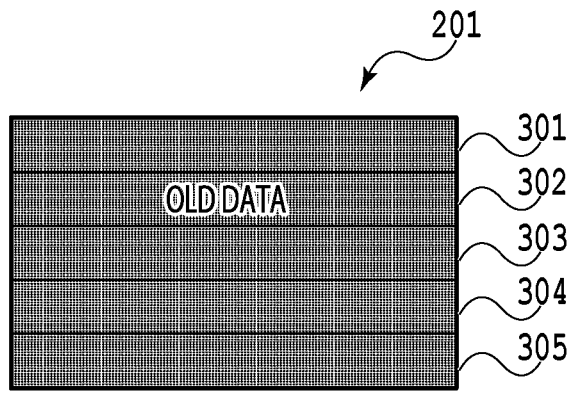

FIG. 7B is a diagram showing the state where the sector group managing the file including the old data becomes invalid from the state in FIG. 7A. In the example shown schematically, the second sector group 302 managing the file including the old data becomes invalid.

Figure 7E:
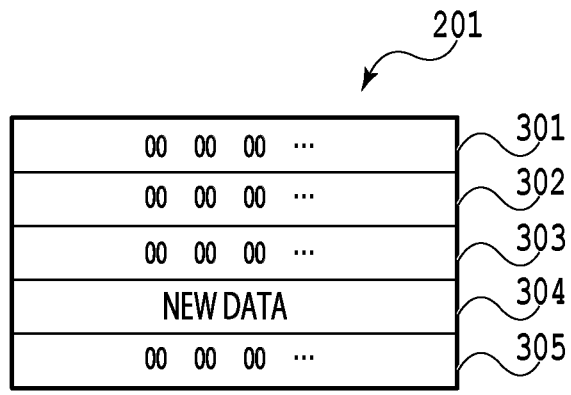
Figure 7C:
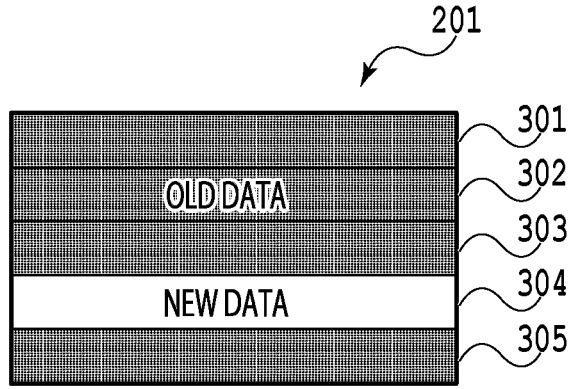

FIG. 7C is a diagram showing the state where the sector group managing the file including the data transmitted together with the updating instructions becomes valid from the state shown in FIG. 7B. Here, the data transmitted together with the updating instructions is called "new data". As an example of "new data", there is a new password a user newly sets.

FIG. 7D is a diagram showing the state where all the sectors in the first storage area 201 become valid from the state shown in FIG. 7C.

FIG. 7E is a diagram showing the state where "dummy data" is written to the dummy file managed in the unprotected sector group at the point in time shown in FIG. 7D. The fourth sector group 304 managing the file including "new data" is protected. Because of this, in the fourth sector group 304, "overwriting processing" is not performed.

Figure 7F:
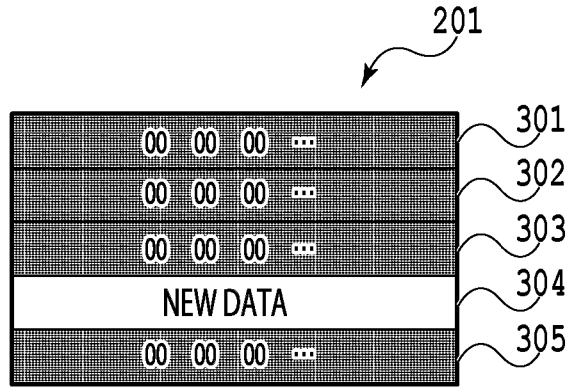

FIG. 7F is a diagram showing the state where a flag indicating that the dummy file is deleted is set to the sector group managing the dummy file from the state in FIG. 7E. Consequently, according to the configuration as in the present embodiment, it is possible to overwrite the dummy data for each sector storing the old data to be updated as alternative processing of secure deletion. For example, it is possible to overwrite the old password used by a user previously with dummy data. Consequently, by the old data remaining in the sector being rewritten with dummy data, it becomes difficult to correctly read the old data. Due to this, it is possible to guarantee data security of data remaining in the sector.

Figure 8:
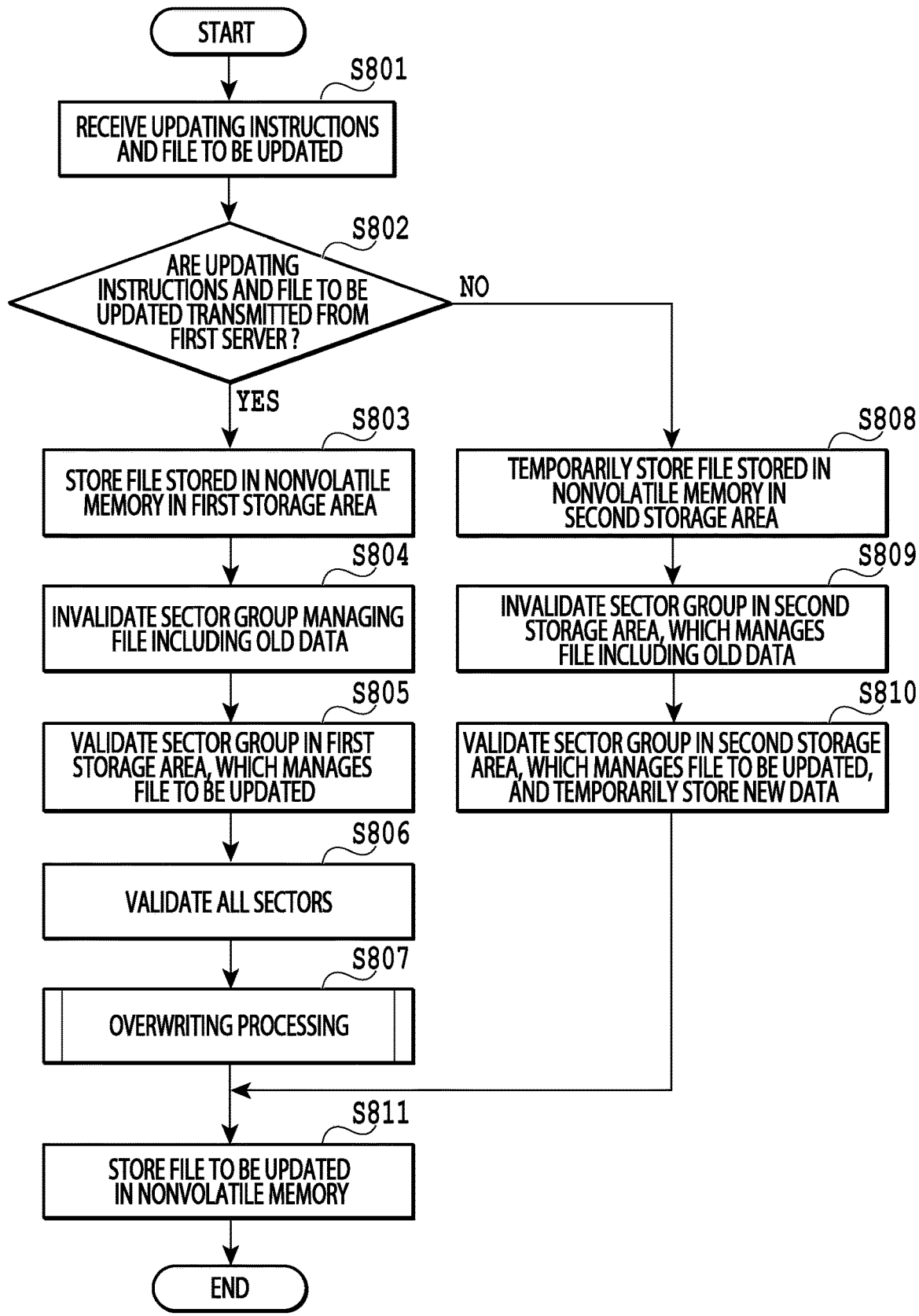
FIG. 8 is a diagram showing a flowchart in one embodiment.

FIG. 8 is flowchart showing processing from reception of instructions to update data until execution of overwriting processing.

At S801, the CPU 103 receives instructions to update old data stored in the second nonvolatile memory 108 and a file to be updated including new data, which include contents to which the old data is updated, from the server. At S802, the CPU 103 distributes processing in accordance with the type of server having transmitted the updating instructions and the file to be updated to the printing apparatus 100. In a case where the server having transmitted the updating instructions and the file to be updated to the printing apparatus 100 is the first server 101, the CPU 103 performs the processing at S803. On the other hand, in a case where the server having transmitted the updating instructions and the file to be updated to the printing apparatus 100 is not the first server 101, the CPU 103 performs the processing at S808.

At S803, the CPU 103 temporarily stores the file stored in the second nonvolatile memory 108 in the first storage area 201. Specifically, the old data stored in the second nonvolatile memory 108 is copied to each sector of the sector group managing the file including the old data in the first storage area 201. At S804, the CPU 103 invalidates each sector of the sector group in the first storage area 201, which manages the file including the old data. At S805, the CPU 103 validates each sector of the sector group in the first storage area 201, which manages the file to be updated. At S806, the CPU 103 validates all the sectors in the first storage area 201. At S807, the CPU 103 performs "overwriting processing". The contents at this step are the same as those in the example shown in FIG. 6. After performing "overwriting processing", the CPU 103 performs the processing at S811.

At S808, the CPU 103 temporarily stores the file stored in the second nonvolatile memory 108 in the second sector storage area 202. Specifically, the old data stored in the second nonvolatile memory 108 is copied to each sector of the sector group managing the file including the old data in the second sector storage area 202. At S809, the CPU 103 invalidates each sector of the sector group in the second sector storage area 202, which manages the file including the old data. At S810, the CPU 103 validates each sector of the sector group in the second sector storage area 202, which manages the file to be updated, and temporarily stores the new data in each sector.

At S811, the CPU 103 stores the file to be updated including the new data in the second nonvolatile memory 108.

The above is the contents of the entire control from reception of instructions to update data until storing of the file to be updated. According to the printing apparatus 100 in the present embodiment, even in a case where data is updated, it is possible to make it difficult to restore confidential data by a method simpler than before.

Other Embodiments

In FIG. 5, explanation is given by taking the example in which a print job is transmitted, but the file that is transmitted from the server is not limited to a print job. The file that is transmitted from the server may be a general document file as long as it has a possibility of including confidential data.

Generally, it is known that the lifetime of a memory is reduced in a case where rewriting of data to the memory is repeated because damage accumulates in the memory. Consequently, it may also be possible to perform control so that overwriting processing is not performed each time a print job or updating instructions are received. Due to this, it is possible to suppress the number of times of rewriting of the memory. For example, it may also be possible to perform control so that overwriting processing is performed in a case where a print job is received the number of times larger than a predetermined number of times. According to the configuration such as this, it is possible to reduce the number of times of rewriting of the memory compared to the case where overwriting processing is performed each time a print job is received. Because of this, for example, it is possible to reduce the processing load imposed on the RAM 105. That is, it is possible to lengthen the lifetime of the RAM 105 compared to the case where overwriting processing is performed each time a print job is received.

Further, in a case where the supply of electric power to the RAM 105 is scheduled to be terminated, it may also be possible to prevent the data temporarily stored in the RAM 105 from being rewritten with dummy data. For example, in a case where the printing apparatus 100 is scheduled to be shut down, it may also be possible to perform control so that overwriting processing is not performed. The reason is that in a case where the printing apparatus 100 is shut down, the data temporarily stored in the RAM 105 disappears completely without the need to perform overwriting processing. Due to this, it is possible to lengthen the lifetime of the RAM 105 compared to the case where overwriting processing is performed for the RAM 105 despite the scheduled shutdown of the printing apparatus 100.

Specifically, there is a case where a tool is installed in advance in the printing apparatus 100, which receives updating of firmware in the printing apparatus 100 as a job. In the network connection environment in this case, the tool automatically receives the most recent firmware. In a case where the printing apparatus 100 receives a firmware updating job, after all the jobs input so far in the queue are completed, an action that "the firmware is updated and the printing apparatus 100 is rebooted" is settled. In this case, the printing apparatus 100 automatically shuts down to reboot itself. As described above, in a case where the printing apparatus 100 receives a firmware updating job, it may also be possible to perform control so that overwriting processing is not performed.

In the first embodiment, as dummy data, zero data is used. As another example of dummy data, it may also be possible to use random data in a case where data temporarily stored in the first storage area 201 is compressed by the run-length algorithm. For example, there is a case where the data temporarily stored in the first storage area 201 becomes zero data as a result of the data being compressed by the run-length algorithm. In the case such as this, there is a possibility that it is not possible to determine whether the stored data becomes zero data because of overwriting processing or because of a result of the compression by the run-length algorithm.

However, by overwriting the data temporarily stored in the first storage area 201 with random data, it is possible to suppress the determination of data from becoming difficult. Further, in a case where data is compressed by the run-length algorithm, the compressed data becomes an array of comparatively simple numbers and the like, and therefore, there is a possibility that the data is analyzed. In contrast to this, in a case where random data is used, compared to the case where zero data is used, the compressed data becomes an array of numbers and the like more complicated than those in the case where zero data is used, and therefore, it is made difficult to analyze the data. That is, by overwriting the data temporarily stored in the first storage area 201 with random data, it is also possible to suppress the data from being analyzed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to make it difficult to restore data remaining in a volatile memory by a method simpler than before.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:
   at least one processor and at least a memory coupled to the at least one processor and having instructions stored thereon, and when executed by the at least one processor, acting as:
   a reception unit configured to receive a file transmitted from an external device;
   a storage unit configured to store data included in the file in a volatile memory in a case where the external device is a server providing a secure printing service;
   an overwriting unit configured to rewrite the data with dummy data, which is stored in a sector to a limit of the capacity in the volatile memory, in a case where the sector of the volatile memory storing the data is invalid,
   wherein the volatile memory is a RAM and can be used as a RAMDISK, with the RAM comprising a first storage area and a second storage area whose capacity is larger than that of the first storage area, and
   the overwriting unit configured to rewrite the data remaining in the first storage area with the dummy data.

2. The printing apparatus according to claim 1, comprising:
   the overwriting unit configured to rewrite the data with the dummy data in a case where the reception unit has received the files a number of times larger than a predetermined number of times.

3. The printing apparatus according to claim 1, comprising:
   the overwriting unit configured not to rewrite the data stored in the volatile memory with the dummy data in a case where supply of electric power to the volatile memory is scheduled to be terminated.

4. The printing apparatus according to claim 1, comprising:
   the overwriting unit configured to rewrite the data with run-length data in a case where the data is compressed by a run-length algorithm.

5. The printing apparatus according to claim 1, comprising:
   the reception unit configured to receive new data and updating instructions for updating the data stored in a nonvolatile storage unit;
   the volatile memory temporarily storing the data and the new data at the same time; and
   the overwriting unit configured to rewrite the data with the dummy data in a case where the data is updated to the new data.

6. A control method of a printing apparatus, the control method comprising:
   receiving a file transmitted from an external device;
   storing data included in the file in a volatile memory in a case where the external device is a server providing a secure printing service;
   rewriting the data stored in a sector with dummy data in a case where the sector of the volatile memory storing the data is invalid, wherein the volatile memory is a RAM and can be used as a RAMDISK;
   providing the RAM with a first storage area and a second storage area whose capacity is larger than that of the first storage area; and
   rewriting the data remaining in the first storage area with the dummy data.

7. A non-transitory computer readable storage medium storing a program for causing a computer to perform a control method of a printing apparatus, the control method comprising:
   receiving a file transmitted from an external device;
   storing data included in the file in a volatile memory in a case where the external device is a server providing a secure printing service;
   rewriting the data with dummy data, which is stored in a sector to a limit of the capacity in the volatile memory, in a case where the sector of the volatile memory storing the data is invalid, wherein the volatile memory is a RAM and can be used as RAMDISK;
   providing the RAM with a first storage area and a second storage area whose capacity is larger than that of the first storage area; and
   rewriting the data remaining in the first storage area with the dummy data.

* * * * *